(12) United States Patent
Vauchel et al.

(10) Patent No.: US 8,726,634 B2
(45) Date of Patent: May 20, 2014

(54) NACELLE FOR AN AIRCRAFT ENGINE WITH VARIABLE CROSS-SECTION NOZZLE HAVING A RACK AND PINION ACTUATOR ASSEMBLY

(71) Applicant: Aircelle, Gonfreville l'Orcher (FR)

(72) Inventors: Guy Bernard Vauchel, Harfleur (FR); Pierre Moradell-Casellas, Saint Georges des Groseillers (FR); Loïc Le Boulicaut, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/656,630

(22) Filed: Oct. 19, 2012

(65) Prior Publication Data
US 2013/0062433 A1  Mar. 14, 2013

Related U.S. Application Data

(63) Continuation of application No. PCT/FR2011/050608, filed on Mar. 23, 2011.

(30) Foreign Application Priority Data

Apr. 20, 2010 (FR) .................................. 10 52971

(51) Int. Cl.
*F02K 3/02* (2006.01)
*F02K 1/76* (2006.01)
*B64D 29/06* (2006.01)

(52) U.S. Cl.
CPC ................. *F02K 1/766* (2013.01); *F02K 1/763* (2013.01); *B64D 29/06* (2013.01)
USPC ........ 60/226.2; 60/226.3; 60/771; 244/110 B; 239/265.19

(58) Field of Classification Search
CPC ............. F02K 1/76; F02K 1/763; F02K 1/72; F02K 3/075; F02K 1/766; B64D 29/06
USPC .......... 60/226.2, 226.3, 770, 771, 230, 226.1; 244/110 B; 239/265.19, 265.25, 265.29
See application file for complete search history.

(56) References Cited

U.S. PATENT DOCUMENTS

| 2,408,099 | A | | 9/1946 | Sherman |
| 3,353,355 | A | * | 11/1967 | Jordan ........................ 60/226.2 |

(Continued)

FOREIGN PATENT DOCUMENTS

| DE | 4334491 A1 * | 4/1995 | ............... B62D 3/12 |
| EP | 0 779 429 | 6/1997 | |

(Continued)

OTHER PUBLICATIONS

PCT/FR2011/050608 International Search Report.

*Primary Examiner* — William H Rodriguez
(74) *Attorney, Agent, or Firm* — Brinks Gilson & Lione (57) ABSTRACT

A nacelle for an aircraft engine is provided that includes a thrust reverser cowling slideably mounted between a direct jet position and a reversed jet position, an outlet jet pipe nozzle with variable cross-section positioned in a downstream extension of the reverser cowling, and means for respectively actuating the cowling and the nozzle. The nozzle is slideably mounted on the thrust reverser cowling, and the means includes at least one actuator for actuating said thrust reverser cowling, at least one driving pinion rotatably mounted on a fixed structure of said nacelle, and at least one rack for actuating the nozzle, secured to the nozzle and meshing with the driving pinion when the thrust reverser cowling is in the direct jet position, and escaping from this pinion when said reverser cowling is in the reversed jet position.

7 Claims, 9 Drawing Sheets

(56) References Cited

U.S. PATENT DOCUMENTS

| | | | | |
|---|---|---|---|---|
| 3,500,646 | A * | 3/1970 | Hom et al. | 60/229 |
| 3,759,467 | A * | 9/1973 | Roudil | 244/53 R |
| 3,829,020 | A * | 8/1974 | Stearns | 239/265.13 |
| 4,356,973 | A * | 11/1982 | Lawson | 239/265.31 |
| 4,407,120 | A * | 10/1983 | Timms | 60/226.2 |
| 4,527,391 | A * | 7/1985 | Marx et al. | 60/226.2 |
| 4,529,130 | A * | 7/1985 | Szuminski et al. | 239/265.29 |
| 5,706,649 | A * | 1/1998 | Robinson et al. | 60/226.2 |
| 5,893,265 | A * | 4/1999 | Gonidec et al. | 60/226.2 |
| 6,592,074 | B2 * | 7/2003 | Dehu et al. | 244/110 B |
| 6,837,054 | B2 * | 1/2005 | Brocard et al. | 60/771 |
| 7,484,356 | B1 | 2/2009 | Lair | |
| 2002/0125370 | A1 * | 9/2002 | Dehu et al. | 244/110 B |
| 2004/0029671 | A1 | 2/2004 | Bock | |
| 2010/0001123 | A1 * | 1/2010 | Hillereau et al. | 244/54 |
| 2012/0096831 | A1 * | 4/2012 | Do et al. | 60/226.1 |
| 2012/0186897 | A1 * | 7/2012 | Kluge | 180/444 |

FOREIGN PATENT DOCUMENTS

| | | |
|---|---|---|
| FR | 2 911 372 | 7/2008 |
| FR | 2 922 059 | 4/2009 |
| GB | 2 304 656 | 3/1997 |
| JP | 2005 226774 | 8/2005 |

* cited by examiner

NACELLE FOR AN AIRCRAFT ENGINE WITH VARIABLE CROSS-SECTION NOZZLE HAVING A RACK AND PINION ACTUATOR ASSEMBLY

CROSS-REFERENCE TO RELATED APPLICATIONS

This application is a continuation of International Application No. PCT/FR2011/050608 filed on Mar. 23, 2011, which claims the benefit of FR 10/52971, filed on Apr. 20, 2010. The disclosures of the above applications are incorporated herein by reference.

FIELD

The present invention relates to a nacelle for an aircraft engine with variable cross-section nozzle

BACKGROUND

The statements in this section merely provide background information related to the present disclosure and may not constitute prior art.

As this is known per se, with an aircraft engine nacelle, it is possible to channel the outside air towards this engine and to ensure ejection of this air at a high velocity so as to provide the required thrust.

In dual flow turbine engines, the air flow blown by the fan is divided, downstream from the latter, into a primary flow (also said to be a <<hot>> flow) which enters the core of the turbine engine so as to undergo several compressions and one expansion therein, and into a secondary flow (also said to be a <<cold>> flow), which circulates inside a substantially annular vein, defined by fairing of the engine (fixed internal structure, also called <<IFS>>) on the one hand, and by the thickness of the nacelle on the other hand.

The cold air flow, which flows out downstream from the nacelle through an outlet jet pipe nozzle defined by the downstream edge of this nacelle, provides the main portion of the thrust.

For reasons of aerodynamic optimization, and thereby optimization of the fuel consumption, it is quite advantageous to be able to adjust the cross-section of the outlet of the cold air flow downstream from the nacelle: indeed it is useful to be able to increase this cross-section during take-off and landing phases, and to reduce it during cruising phases: this is often referred to as an adaptive nozzle, or still further as <<VFN>> (Variable Fan Nozzle).

Moreover, as this is known per se, the nacelle very frequently incorporates thrust reversal means giving the possibility of directing towards the upstream side of the nacelle a portion of the secondary air flow during landing, which actively contributes to braking the aircraft.

These thrust reversal means are often of the type with deflection grids, i.e. they include a series of grids positioned downstream from the fan case, at the periphery of the cold flow vein, these grids may be exposed on command by a thrust reverser cowling slideably mounted on the structure of the nacelle.

The outlet jet pipe nozzle of the secondary air flow is located in the downstream extension of the thrust reverser cowling, and it is important to be able to actuate both of these portions of the nacelle independently: the intention is in particular to be able to increase the cross-section of the nozzle without actuating the thrust reversal means, in particular during take off.

Various solutions exist in the state of the art for actuating these members independently of each other.

A known solution consists of providing independent cylinder actuators for both of these members.

Another known solution consists of using dual rod cylinders, one rod actuating the thrust reverser cowling and the other rod actuating the outlet jet pipe nozzle.

Still another solution consists of using actuators which only actuate the outlet jet pipe nozzle, and of providing controlled means for locking the reverser cowling to the nozzle, which are closed when the nozzle is at the downstream end-of-travel in order to be then able to drive the thrust reverser cowling, and which are opened once that the thrust reverser cowling has again found its <<direct jet>> position, in order to be able to bring back the outlet jet pipe nozzle to its upstream position.

All these prior solutions have notably the drawback of having a high weight, because of the specific actuators and/or of the locking means used for allowing independent actuation of the reversal cowling of a reverser and of the ejection nozzle.

SUMMARY

The present disclosure provides a nacelle for an aircraft engine, comprising a thrust reverser cowling slideably mounted between a direct jet position and a reversed jet position, a variable cross-section outlet jet pipe nozzle positioned in the downstream continuation of this reverser cowling, and means for respectively actuating this cowling and this nozzle, remarkable in that said ejection nozzle is slideably mounted on said thrust reverser cowling, and said thrust reversal means comprise:

at least one actuator for actuating said thrust reverser cowling, at least one driving pinion rotatably mounted on the fixed structure of said nacelle, and at least one rack for actuating said ejection nozzle, secured to this nozzle and meshing with said driving pinion when said thrust reverser cowling is in the direct jet position, and escaping from this pinion when said reverser cowling is in the reverse jet position.

By these features, the independent actuation of the ejection nozzle relatively to the thrust reverser cowling, is carried out by means of a system of the rack and pinion type, notably simpler, less bulky and less heavy than the various systems of the prior art.

According to other optional features of the nacelle according to the invention:

this nacelle comprises a plurality of actators for actuating said thrust reverser cowling, and a plurality of rack and pinion devices for actuating said ejection nozzle;

said rack and pinion devices are positioned in the vicinity of spars at 12 o'clock and 6 o'clock of the fixed structure of said nacelle: these spars respectively positioned at the top and in the diametrically opposite low portion of the nacelle, conventionally allow the mounting and displacements of the mobile elements of the nacelle;

said nacelle comprises means for locking said nozzle to said thrust reverser cowling when said nozzle is in its extreme downstream position and when the thrust reverser cowling is in the direct jet position: these locking means allow displacement of the ejection nozzle simultaneously with the thrust reverser cowling under the action of said actuators;

said nacelle comprises means for compensating the play between each pinion and its associated rack: these means for compensating play allow the pinion to easily mesh again with the teeth of the rack when the latter returns to the upstream position under the effect of the upstream displacement of the thrust reverser cowling;

said means for compensating play comprise means for elastically suspending said pinion on the fixed structure of the nacelle;

said means for compensating play comprise at least one roller with an axis parallel to that of said pinion, capable of returning said rack to contact with said pinion.

Further areas of applicability will become apparent from the description provided herein. It should be understood that the description and specific examples are intended for purposes of illustration only and are not intended to limit the scope of the present disclosure.

DRAWINGS

Other features will become apparent in the light of the description which follows, and upon examining the figures appended herein, wherein.

On the whole of these figures, identical or similar references designate identical or similar members or assemblies of members.

A reference system XYZ is placed on the whole of these figures, the three axes of which represent the respective longitudinal, transverse and vertical directions of the nacelle, respectively.

It should be noted that the arrow of the X axis points towards the upstream portion of the nacelle, this term being understood relatively to the airflow intended to cross the nacelle during operation.

It will also be noted that the description which follows is more particularly focussed on a rear nacelle portion, i.e. on the portion of the nacelle which is located downstream from the fan case, since it is at this location where the invention is located.

Furthermore it will be noted that care will only be taken for actually describing a half-nacelle, being aware that the other half-nacelle, i.e. the one which is located on the other side of the suspension spar, is inferred from the half nacelle which will be described by simple symmetry relatively to a vertical plane parallel to the XZ plane.

The drawings described herein are for illustration purposes only and are not intended to limit the scope of the present disclosure in any way

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
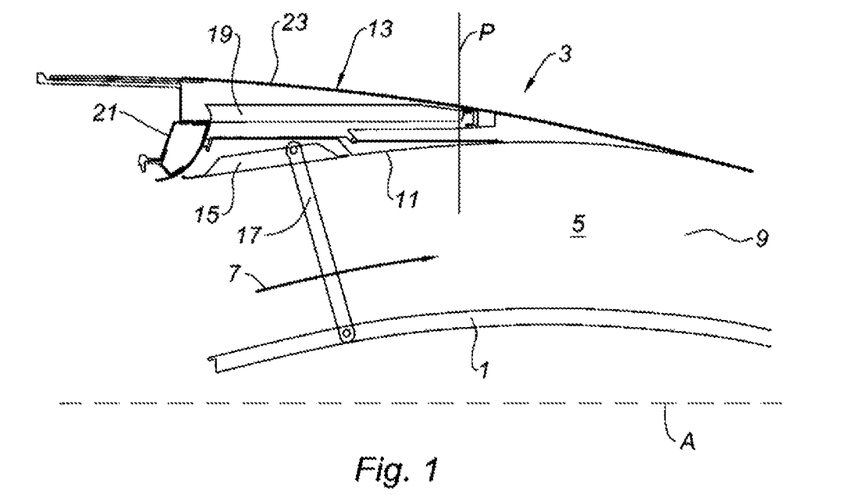
FIG. 1 illustrates in an axial sectional view, the rear portion of a nacelle according to the invention in the cruising configuration.

Reference is now made to FIG. 1, in which a rear nacelle portion according to the invention may be seen in a cruising situation.

As this is visible in this FIG. 1, this rear nacelle portion includes a fixed inner structure 1, intended to form a fairing of a turbine engine (not shown) centred around the axis A and a mobile outer structure 3 defining a secondary air flow vein 5 in which a secondary air flow 7 generated by the fan (not shown) should circulate, and flowing out through an outlet cross-section 9 so as to ensure the thrust of the aircraft.

More specifically, the mobile outer structure 3 includes a radially inner mobile portion 11 forming a thrust reverser cowling, and a radially outer portion 13 forming a variable cross-section nozzle.

On the thrust reverser cowling 11, thrust reversal flaps 15 are jointedly mounted, each connected to the fixed internal structure 1 through connecting rods 17.

Thrust reversal grids 19 are fixedly mounted on a front frame 21 with a substantially annular shape, itself attached downstream from the fan case (not shown).

In the cruising situation illustrated in FIG. 1, the thrust reverser cowling 11 and the upstream portion 23 of the outlet nozzle 13 cover the thrust reversal grids 19. The thrust reversal flaps 15 being, as for them, positioned in the extension of the thrust reverser cowling 11, so as to allow the cold air flow 7 to freely circulate in the vein 5.

Figure 9:
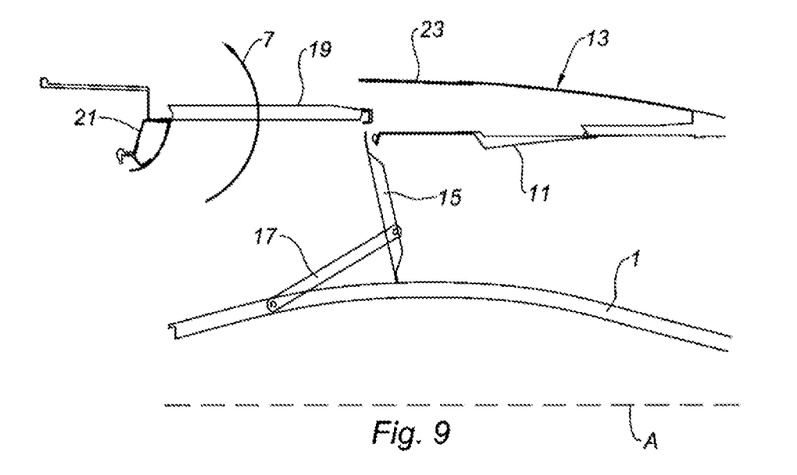
FIGS. 9, 10 and 11 are similar to FIGS. 1, 2 and 4, respectively, the rear nacelle portion being found in the thrust reversal configuration, FIGS. 12, 13 and 14 similar to FIG. 5, schematically illustrate the different steps for having the rear nacelle portion move to its thrust reversal position, FIG. 15, similar to FIG. 4, schematically illustrates the return of the rear nacelle portion towards its position of FIGS. 6-8, FIG. 16, similar to FIG. 4, schematically illustrates the return of the outlet jet pipe nozzle to its cruising position, and FIGS. 17 and 18, similar to FIG. 3, illustrate two alternatives for compensating the play between a driving pinion and a rack secured to the outlet jet pipe nozzle of the rear nacelle portion according to the invention.

In the thrust reversal situation illustrated in FIG. 9, the thrust reverser cowling 11 and the outlet jet pipe nozzle 13 have each slid downstream from the deflection grids 19, causing pivoting of the thrust reversal flaps 15 across the secondary flow vein 5, causing deflection of the secondary air flow 7 through the grids 19, outwards and towards the upstream portion of the nacelle.

In the following, we shall endeavour to describe in more detail the mechanism according to the invention giving the possibility of passing from the position of FIG. 1 to the position of FIG. 9.

Figure 3:
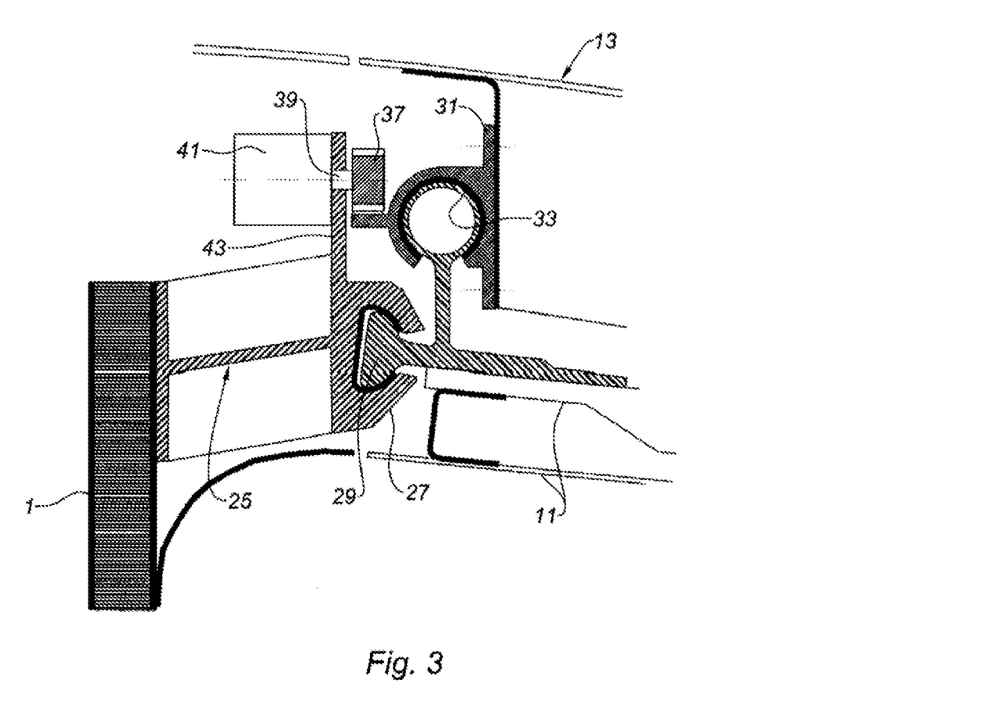
FIG. 3 is a partial view of this rear portion of the nacelle, in a sectional view along the transverse plane P of FIGS. 1 and 2.

As this is visible in FIG. 3, the inner thrust reverser cowling 11 is connected to the fixed inner structure 1 via a longitudinal spar 25, defining a first slide 27 inside which a first longitudinal slider 29 may slide.

The outlet nozzle 13 is, as for it, secured to a second longitudinal slide 31 inside which a second longitudinal slider 33 may slide, itself firmly attached to the first longitudinal slider 29.

Figure 4:
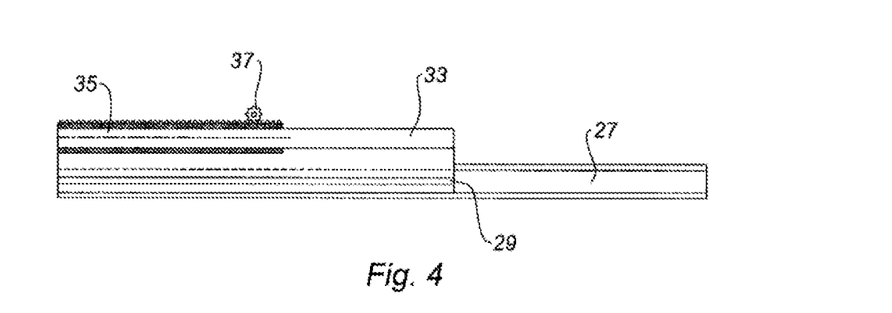
FIG. 4 is a view of the sliding mechanism of this rear nacelle portion.

Along this second slide 31 extends a rack 35 capable of cooperating with a pinion 37 mounted on the shaft 39 of an engine 41 itself attached on an extension 43 of the spar 25, as this is notably visible in FIGS. 3 and 4.

It should be noted that the assembly for guiding the VFN may be inverted, i.e. the slide may be integrated to the first longitudinal slider 29 instead of the longitudinal slider 33. In this configuration, the driving by the pinion 37 may be accomplished in the upper plane of the axis of the slide.

Also, the rack and pinion assembly may be placed in a location other than the slide-slider system like the side structure of the outlet jet pipe nozzle 13.

As this is therefore understandable at this stage, the electric motor 41 is capable of causing sliding of the second slide 31 relatively to the second slider 33, i.e. the sliding of the outlet jet pipe nozzle 13 relatively to the inner cowling 11.

Figure 2:
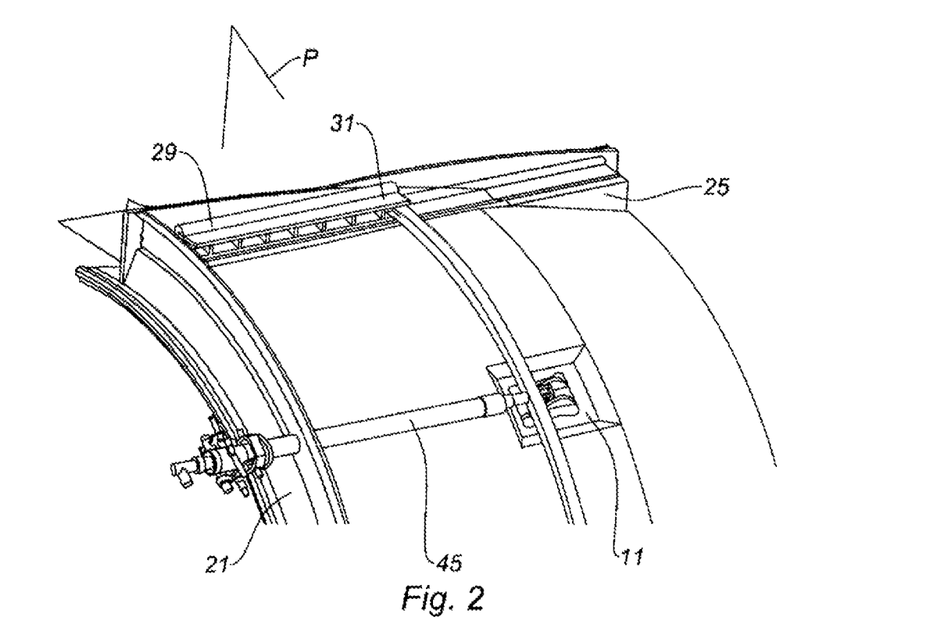
FIG. 2 illustrates this rear portion in a perspective view.

The actuation of this inner cowling 11 is, as for it, carried out by a plurality of cylinders, one 45 of which is visible in FIG. 2. This cylinder being attached to one end on the front frame 21 and the other end on the inner cowling 11.

Figure 5:
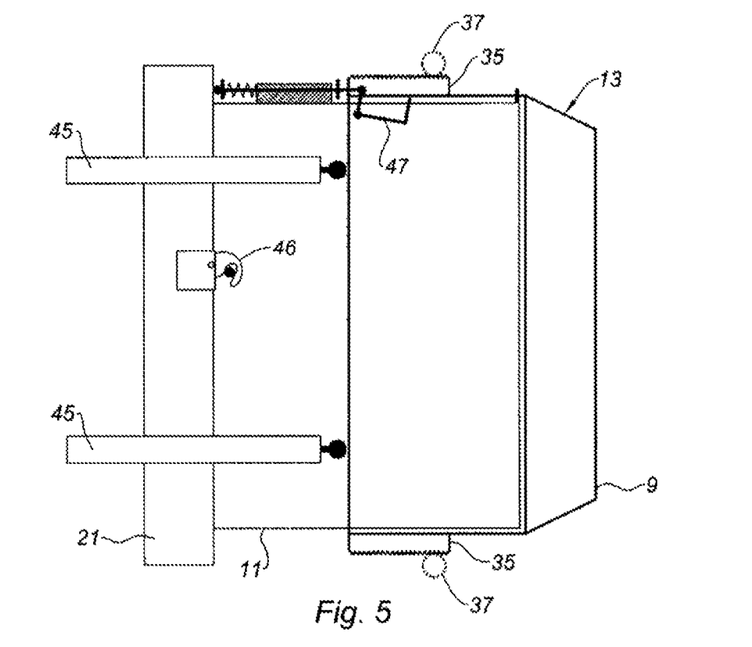
FIG. 5 is a schematic view of this rear nacelle portion, in the cruising configuration.

The main members which have been described are schematically illustrated in FIG. 5, corresponding to a direct jet and cruising configuration.

In this configuration, the thrust reversal inner cowling 11 is in its upstream position, and locked by a first lock 46 to the front frame 21.

The cylinder actuators 45 are in the retracted position.

The ejection nozzle 13 is in an upstream position relatively to the inner cowling 11, i.e. the driving pinions 37 (in reality there are two per half-nacelle, one in the upper portion of this half-nacelle and another one in the lower portion) are each found downstream from their associated rack 35.

A second lock 47, capable of securing the ejection nozzle 13 with the inner cowling 11, is in the open position.

This configuration corresponds to a cruising flight, during which of course the thrust reversal means have to be inactive, and the outlet cross-section 9 of the nozzle 13 should be minimum.

Figure 6:
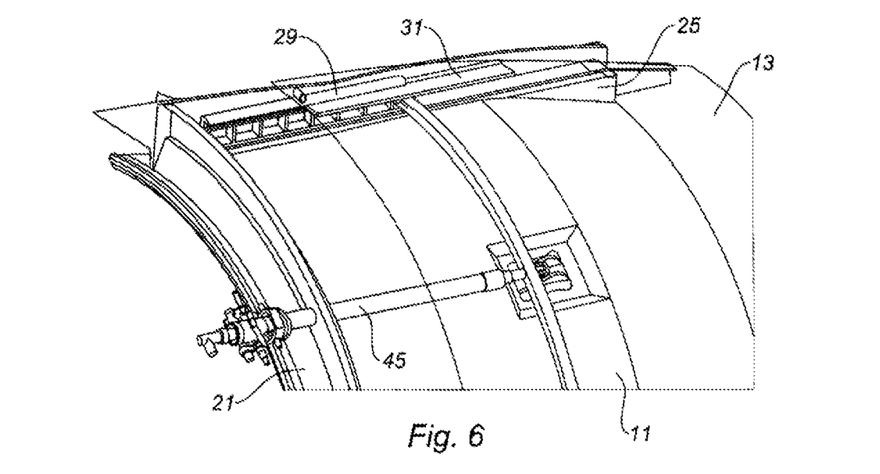
FIGS. 6, 7, 8 are views similar to FIGS. 2, 4, 5 respectively, the outlet jet pipe nozzle of the rear nacelle portion being found in the take-off or landing configuration.
Figure 7:
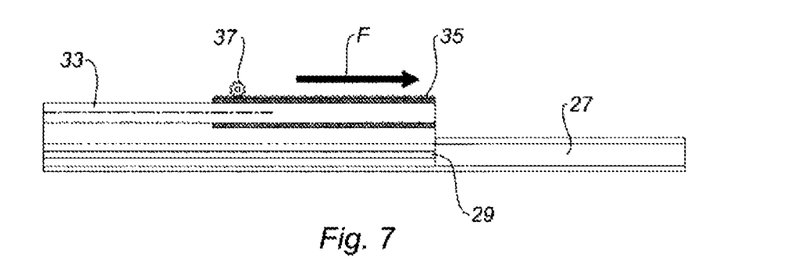
Figure 8:
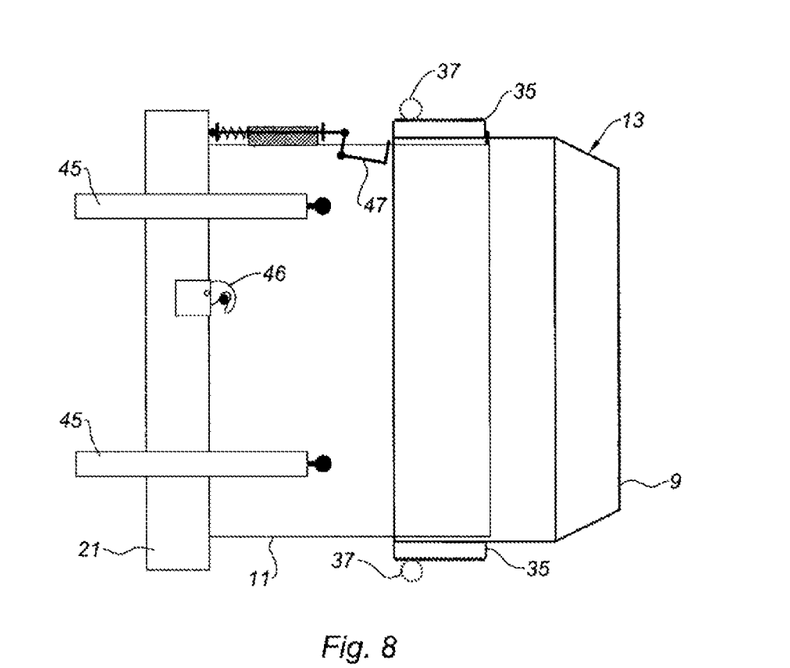

Reference is now made to FIGS. 6 to 8, corresponding to a take-off or landing situation.

In this situation, it is important to be able to increase the cross section 9 of the outlet jet pipe nozzle 13, and for this, this outlet jet pipe nozzle has to be displaced downstream from its position illustrated in FIGS. 1 to 5.

This is achieved by rotating the pinions 37 by means of their respective motors 41, which has the effect of displacing each rack 35 downstream, as indicated by the arrow F of FIG. 7.

By doing this, the outlet jet pipe nozzle 13 returns to its downstream position visible in FIGS. 6 and 8, the inner thrust reverser cowling 11 having, as for it, not been moved.

Figure 10:
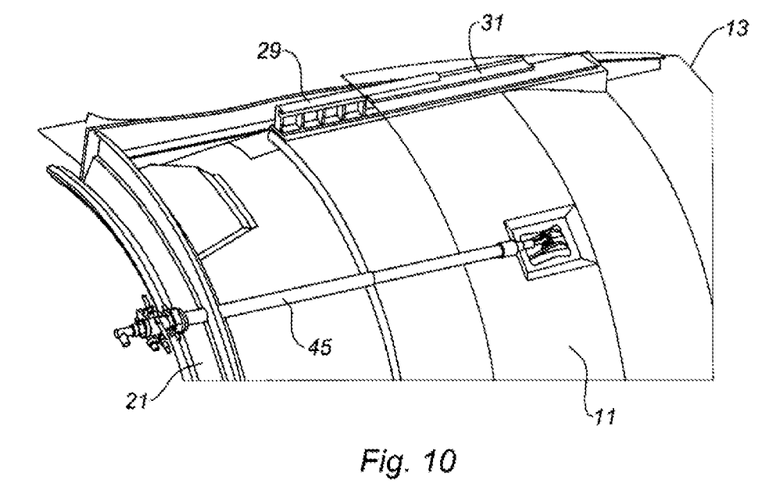

Now, when it is desired to achieve thrust reversal (see FIG. 9) for landing, the first lock 46 is released and the actators 45 are actuated so as to cause sliding of the assembly formed by the inner cowling 11 and the outlet jet pipe nozzle 13 along the first slide 27, as illustrated in FIG. 10.

Figure 11:
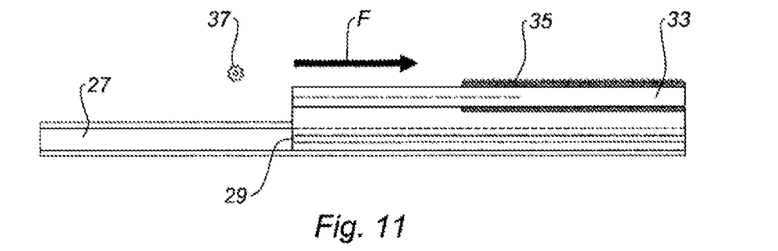

More specifically, as this is visible in FIG. 11, in which simultaneous sliding of both of these members is indicated by the arrow F, each rack 35 escaping from its respective driving pinion 37.

Figure 12:
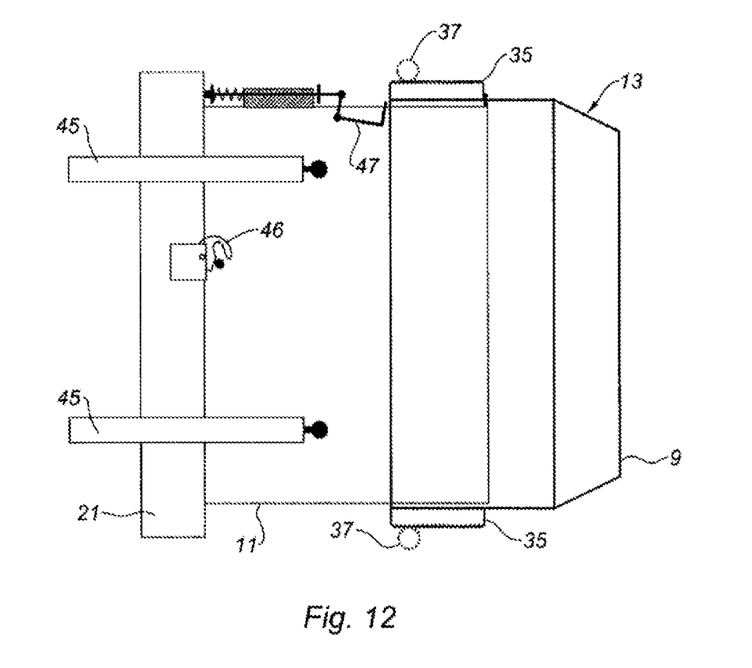
Figure 13:
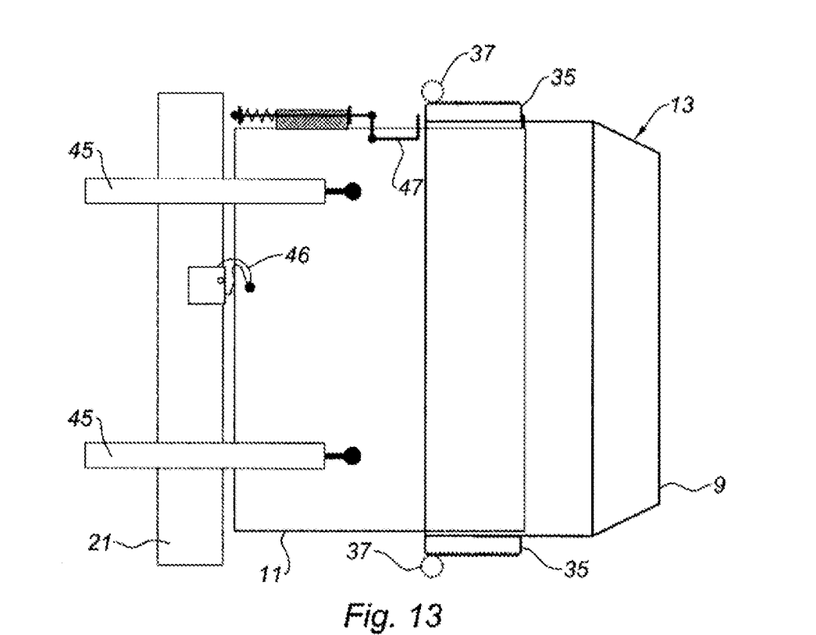
Figure 14:
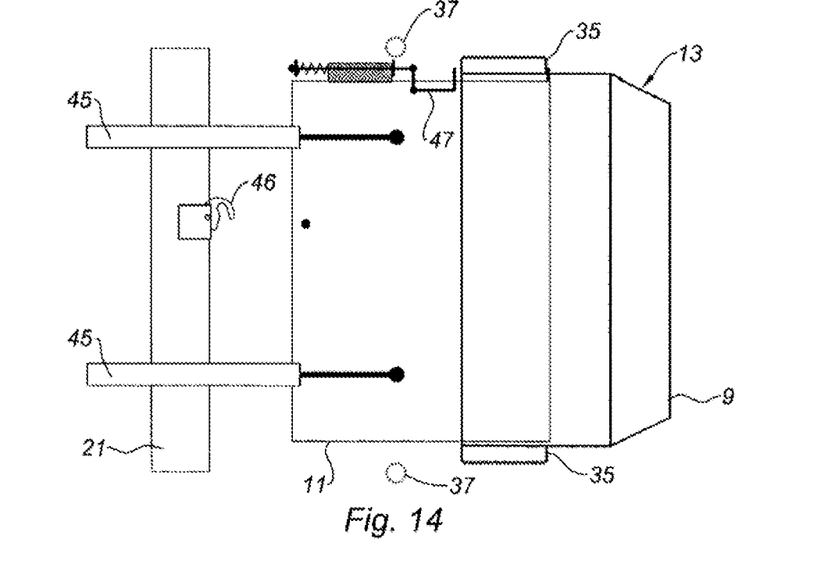

More specifically, reference is made to FIGS. 12 to 14, in which the sequencing of the various members which intervene during the passing into the thrust reversal position, may be seen.

As this is visible in FIG. 12, as the outlet jet pipe nozzle 13 is therefore in its downstream position, the lock 46 is released.

Next, as visible in FIG. 13, the second lock 47 is closed, so as to secure the outlet jet pipe nozzle 13 with the inner thrust reverser cowling 11.

The actuators 45 are then actuated, allowing simultaneous displacement of this cowling and of this nozzle to their downstream position, causing each pinion 37 to be released from its respective rack 35 (see FIG. 14).

In this thrust reversal position, under the action of the connecting rod 17, the thrust reversal flaps 15 hinder the secondary flow vein 5, and cause return of secondary air towards the outside and towards the front of the nacelle, as this is indicated by the arrow 7 in FIG. 9.

Figure 15:
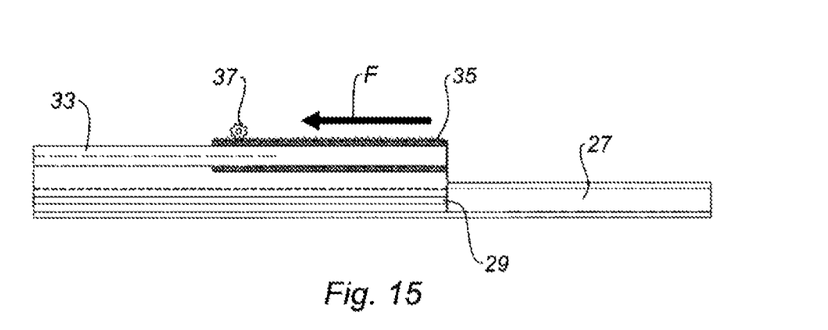

The return of the nacelle according to the present disclosure to its initial position is carried out in two steps: as this is visible in FIG. 15, first of all, one starts by retracting the actuators 45 so as to bring back the assembly formed by the inner thrust reverser cowling 11 and the outlet jet pipe nozzle 13 to the direct jet position, this overall movement being illustrated by the arrow F of FIG. 15.

By doing this, each rack 35 comes back and meshes with its associated driving pinion 37.

Figure 16:
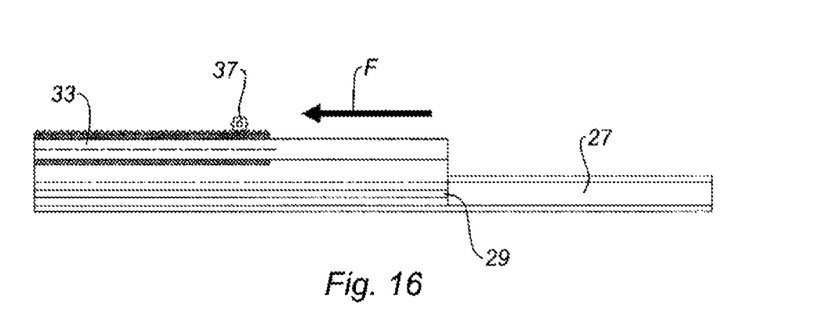

Next, in order to return the outlet jet pipe nozzle 13 to its upstream position (small cross-section, corresponding to a cruising situation), the pinions 37 are rotated by means of their respective motors 41 in the direction opposite to the one of FIG. 7, until the upstream portion 23 of the outlet jet pipe nozzle 13 will completely cover the thrust reversal grids 19.

As this may be understood in the light of the foregoing, independent actuation of the inner thrust reverser cowling 11 and of the outlet jet pipe nozzle 13 may be carried out with much more lightweight means than those of the prior art, the rack and pinion system having a size and a weight which are clearly less than those of the systems with two actuators or with dual rod actuators of the prior art.

One of the particular points of the invention lies in the fact that it has to be possible to ensure that each rack 35 actually comes back to mesh with its associated driving pinion 37, notwithstanding the plays and deformations which may occur.

Figure 17:
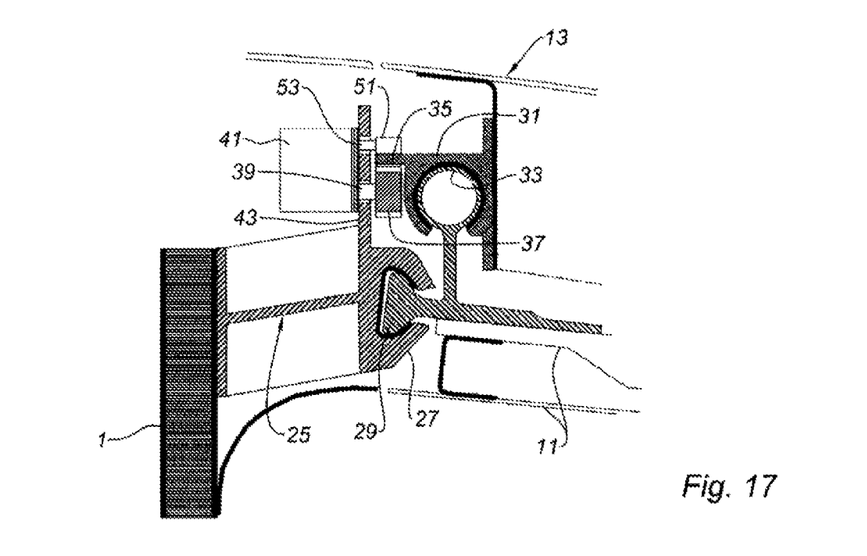

For this, a play compensation system should be provided, which may for example comprise, as this is illustrated in FIG. 17, a roller 51 mounted so as to be idle on the spar 25, with an axis 53 parallel to the shaft 39 of the motor 41, and capable of pushing back the rack 35 to contact with the teeth of the pinion 37, when this rack returns from the position illustrated in FIG. 11 to the position illustrated in FIG. 15.

Figure 18:
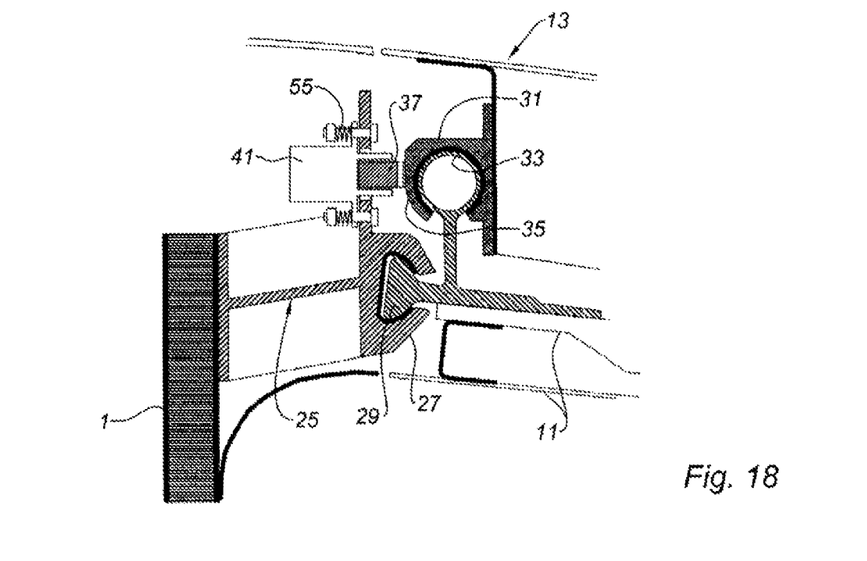

Alternatively, as this is illustrated in FIG. 18, provision may be made for having the motors 41 connected through elastic suspension means 55 to the fixed spar 25, the pinions 37 pivoting around a substantially vertical axis, i.e. parallel to the large edge of the drawing board 9/9 appended herein.

Of course, the present invention is by no means limited to the described and illustrated embodiment.

Thus for example it may be envisioned to do without the second lock 47 for connecting the inner reversal cowling 11 with the outlet jet pipe nozzle 13, it being observed that the secondary air flow as well as the outer air naturally tend to maintain the outlet jet pipe nozzle 17 in the position as downstream as possible relatively to the inner cowling 11.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft engine, comprising a thrust reverser cowling slideably mounted between a direct jet position and a reversed jet position, an outlet jet pipe nozzle with variable cross-section positioned in a downstream extension of the reverser cowling, and means for respectively actuating the cowling and the nozzle, characterized in that said nozzle is slideably mounted on said thrust reverser cowling, and said means comprises:

at least one actuator for actuating said thrust reverser cowling, at least one driving pinion rotatably mounted on a fixed structure of said nacelle, and at least one rack for actuating said nozzle, secured to the nozzle and meshing with said driving pinion when said thrust reverser cowling is in the direct jet position, and escaping from this pinion when said reverser cowling is in the reversed jet position.

2. The nacelle according to claim 1, further comprising a plurality of actuators for actuating said thrust reverser cowling and a plurality of rack and pinion devices for actuating said nozzle.

3. The nacelle according to claim 2, characterized in that said rack and pinion devices are positioned in the vicinity of spars at 12 o'clock and 6 o'clock of the fixed structure of said nacelle.

4. The nacelle according to claim 1, further comprising a means for locking said nozzle to said thrust reverser cowling when said nozzle is found in its extreme downstream position and when the thrust reverser cowling is found in the direct jet position.

5. The nacelle according to claim 2, further comprising a means for compensating play between each pinion and its associated rack.

6. The nacelle according to claim 5, characterized in that said means for compensating play comprise means for elastically suspending said pinion on the fixed structure of the nacelle.

7. The nacelle according to claim 5, characterized in that said means for compensating play comprise at least one roller with an axis parallel to that of said pinion, capable of returning said rack to contact with said pinion.

* * * * *